United States Patent [19]

Snow, Sr. et al.

[11] 4,399,092

[45] Aug. 16, 1983

[54] MANUFACTURE OF PIPE THREAD PROTECTORS

[76] Inventors: Roger L. Snow, Sr., 10923 Loch Bend Ct., Houston, Tex. 77086; Thomas J. Atkinson, 11735 Fannview, Houston, Tex. 77070

[21] Appl. No.: 284,690

[22] Filed: Jul. 20, 1981

[51] Int. Cl.³ .............................................. B29D 1/00
[52] U.S. Cl. .................................... 264/318; 138/96 T
[58] Field of Search ........................................... 264/318

[56] References Cited

U.S. PATENT DOCUMENTS

| | | | |
|---|---|---|---|
| 3,006,030 | 10/1961 | Paull | 264/318 |
| 3,013,308 | 12/1961 | Armour | 264/318 |
| 3,150,222 | 9/1964 | Blaustein et al. | 264/318 |
| 3,247,548 | 4/1966 | Fields et al. | 264/318 |
| 3,325,576 | 6/1967 | Kessler | 264/318 |
| 3,344,942 | 10/1967 | Hedgewick | 264/318 |
| 3,584,092 | 6/1971 | Alexandris | 264/318 |

FOREIGN PATENT DOCUMENTS 2046227 11/1980 United Kingdom ................ 264/318

Primary Examiner—James H. Derrington
Attorney, Agent, or Firm—Neal J. Mosely

[57] ABSTRACT

A cup shaped or cylindrical thread protector, having circumferentially spaced, internally projecting lugs, is formed by injection molding of a thermoplastic resin into a female mold cavity having a smooth cylindrical interior and having a male mold member fitting therein and cooperable therewith to define a cup shaped or cylindrical cavity. The male mold member has a plurality of recesses of a size and shape operable to produce said lugs in the molded thread protector produced therein. When the thread protector is molded, the male mold member is rotated about its axis sufficiently to compress said lugs into the cup wall thereof at a time after the thermoplastic has solidified but before it has cooled and is then pulled from within the cup shaped member.

12 Claims, 5 Drawing Figures

MANUFACTURE OF PIPE THREAD PROTECTORS

BACKGROUND OF THE INVENTION

1. Field of the Invention

This invention relates to new and useful improvements in molded thermoplastic thread protectors for the threaded ends of pipe or casing and to methods of manufacturing thereof.

2. Description of the Prior Art

In shipping industrial pipe, conduit and casing which are threaded at the ends, it has been necessary to provide protectors to prevent damage to the threads. At the present time, one of the most commonly used thread protectors for threaded pipe or casing is one which is made of thermoplastic material, cup shaped and internally threaded to fit the threaded ends of the pipe or casing requiring protection. Thread protectors of this type require considerable time for application and have to be screwed on the ends of the pipe which is a time consuming process. As a result, there has been a considerable need for thread protectors which can be applied without the need for screwing onto the threaded ends of the pipe and which will not slip off the threaded ends during shipment and handling.

Halsey U.S. Pat. No. 3,485,271 discloses an internally threaded protector for pipe threads.

Vestal U.S. Pat. No. 3,744,528 discloses a tubular plastic closure member for metal tubes or pipe.

Callicoatte U.S. Pat. No. 4,239,062, discloses a plastic thread protector for threaded pipe having a cup shaped construction with longitudinally extending ribs for gripping the threads to be protected. The use of longitudinally extending ribs does not provide any means for securing the protector on threaded pipe and there is a tendency to slip off.

Curtiss U.S. Pat. No. 2,900,435 discloses a plastic bushing for the ends of electrical conduit which may be hammered into place. The bushing is formed of plastic material and is internally threaded.

In the formation of molded plastic objects having internal threads and lugs and the like, special consideration has to be given to the design of the molds for forming such parts.

Blaustein U.S. Pat. No. 3,150,222 discloses apparatus for molding threaded articles of thermoplastic by the injection molding process. This involves the use of a two part mold in which one of the parts has threaded recesses forming threads in the molded article. The threaded part of the mold has to be withdrawn from the molded article by unscrewing the article therefrom.

Armour U.S. Pat. No. 3,013,308 discloses a method and apparatus for manufacture of threaded plastic parts. The internal portion of the mold is threaded and the part must unscrewed from the threaded portion of the mold.

Zulaf U.S. Pat. No. 3,350,044 discloses cup shaped covers for the ends of electrical conduit having longitudinally extending internal ribs for securing the covers in place.

Fields U.S. Pat. No. 3,247,548 discloses a method and apparatus for molding internally threaded cup shaped parts of thermoplastic by use of a mold having a collapsible inner portion.

Kessler U.S. Pat. No. 3,325,576 discloses a method and apparatus for molding internally threaded parts of plastic having a two part inner mold segment, one part of which is movable to eject the molded threaded piece from the mold.

Alexandris U.S. Pat. No. 3,584,092 discloses a vacuum molding process for drawing a sheet of thermoplastic material into a female mold cavity and having threaded ribs to be formed in the molded product.

In the manufacture of molded parts of thermoplastic materials by the injection molding process, when the product is manufactured with internal ribs or threads, it has been necessary to remove the molded part by an unscrewing operation or to remove the insert portion of the mold by means of collapsing the same. Thus, it has been necessary to use collapsible mold inserts in order to remove the mold insert from the molded part where under cuts or lugs are produced in the molding operation.

There has not been a practical means provided for the molding of internal ribs which extends circumferentially of a molded part without the use of collapsible mold inserts.

SUMMARY OF THE INVENTION

One of the objects of this invention is to provide a new and improved, injector molded, thermoplastic thread protector for threaded pipes and casing and the like which can be driven onto the threaded pipe ends by pounding or hammering rather than by a screwing or threading operation.

Another object of this invention is to provide a new and improved cup shaped or hollow cylindrical thermoplastic thread protector for the threaded pipes or casing or the like having separate internal lugs which permit the protector to be driven onto a threaded pipe end and which function to hold the protector in place after installation.

Another object of this invention is to provide an improved method of manufacture of a cup shaped thermoplastic thread protector for threaded pipe or casing or the like in which the thread protector has a plurality of separate internally extending lugs.

Still another object of this invention is to provide a new and improved process or method for injection molding of cup shaped or hollow cylinder thermoplastic thread protectors having internally extending lugs which does not require the use of a collapsible mold portion.

Still another object of this invention is to provide a new and improved method for injection molding cup shaped or hollow cylindrical thermoplastic thread protectors for threaded pipe or conduit or the like and having internally extending ribs in which the male portion of the mold which forms the internal ribs or lugs is operated to compress the ribs or lugs into the wall of the thread protector before removal therefrom.

Other objects of this invention will become apparent from time to time throughout the specification and claims are hereinafter related.

The above noted objects and other objects of the invention are accomplished by a molded thermoplastic thread protector for the threaded ends of pipe or casing which consists of a hollow cylindrical or cup shaped member only slightly larger than the threaded pipe end and adapted to fit thereover. The interior surface of said cup shaped or cylindrical member has a plurality of separate, circumferentially spaced, internally projecting lugs, each having a rear face toward the closed end wall or rear end of said cup shaped or cylindrical member extending substantially normal to the longitudinal axis thereof and having a forward face or wall portion in the form of an inclined surface extending toward the open end of said cup shaped or cylindrical member. Said lugs are of a size and shape to be forced over the threaded end of a pipe to engage the threads thereof to prevent easy and accidental removal. The cup shaped or clyindrical thread protector is formed by injection molding of a thermoplastic resin into a female mold cavity having a smooth cylindrical interior and having a male mold member fitting therein and cooperable therewith to define a cup shaped or hollow cylindrical cavity. The male mold member has a plurality of recesses of a size and shape operable to produce said lugs in the molded thread protector produced therein. When the thread protector is molded, the male mold member is rotated about its axis sufficiently to compress said lugs into the cup wall thereof at a time after the thermoplastic has solidified but before it has cooled and is then pulled from within the cup shaped member.

DESCRIPTION OF THE PREFERRED EMBODIMENTS

The Thread Protector

Figure 1:
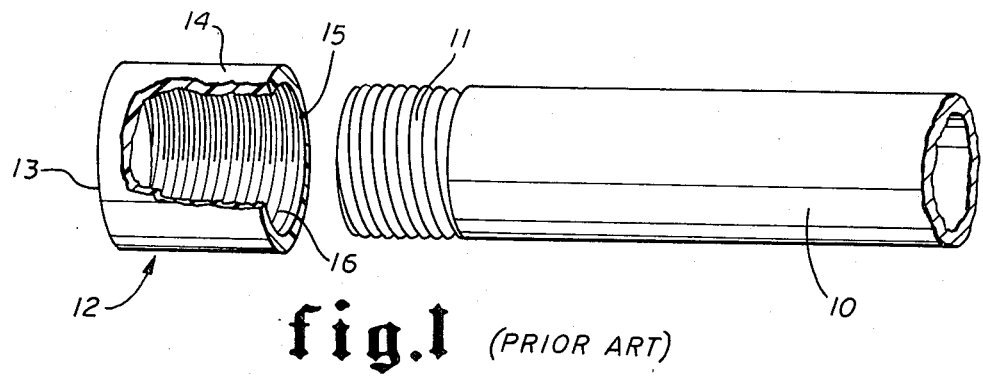
FIG. 1 is an isometric view of a threaded end of pipe and a prior art type of molded plastic thread protector.

In FIG. 1, there is shown a pipe or casing or conduit 10 having a threaded end portion 11 and a prior art type of thread protector 12 therefor. Thread protector 12 is formed of a thermoplastic resin and has a closed end wall 13, cylindrical side wall 14 and open end 15. The inner surface of the cylindrical side wall 14 is threaded as indicated at 16 with threads that match the threaded end 11 of pipe or conduit or casing 10. This prior art type of thread protector 12 is screwed manually onto threaded end 11 to provide protection for the threads during shipment or handling. This prior art type of thread protector 12 has required a considerable amount of manual work and lost time in placing the protector in position on the threaded end 11 of pipe 10. As a result, there has been a substantial need for thread protectors that can be easily installed securely in position without resorting to a manual threading of the protector on the end of the pipe.

Figure 2:
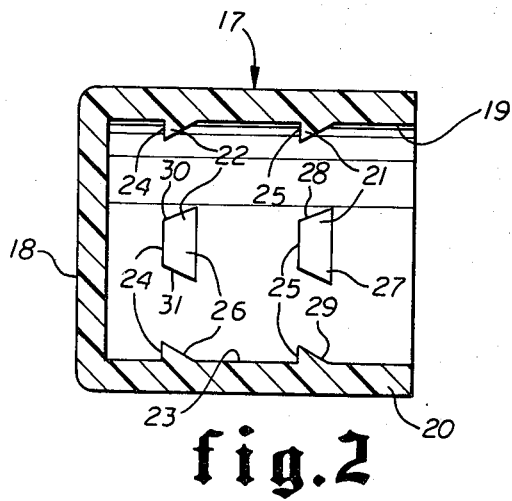
FIG. 2 is a view in longitudinal central section of a thread protector for threaded pipe or casing or conduit representing a preferred embodiment of this invention.
Figure 3:
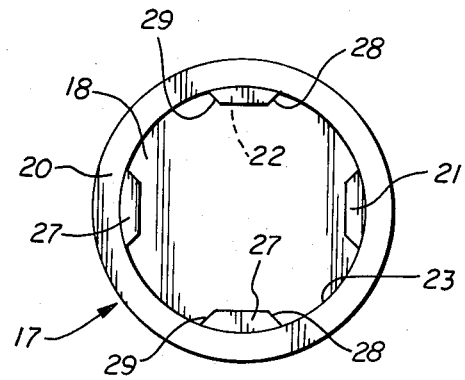
FIG. 3 is a view in right end elevation looking into the open base of the thread protector shown in FIG. 2.

In FIGS. 2 and 3, there is shown a preferred embodiment of an improved pipe threaded protector 17 which can be installed by application of an end-wise force, as by pounding or hammering. Thread protector 17 is of a thermoplastic material and is of injection molded construction. The thermoplastic material is a relatively soft thermoplastic material, as distinguished from hard plastic materials that are formed by thermosetting resins.

The material may be any suitable thermoplastic resin which can be injection molded but is preferably a material of high impact strength such as a high impact nylon or a high impact polyethylene. Thread protector 17 is a cup shaped member having closed end wall 18 and open end 19. If desired, the closed end wall can be eliminated and the structure made as a hollow cylinder. Thread protector 17 has cylindrical side wall 20 and has a plurality of lugs 21 and 22 spaced circumferentially on the inner surface 23 thereof. Lugs 21 and 22 are integral with cylindrical side wall 20 and protrude inwardly therefrom. Lugs 21 and 22 have rear faces 24 and 25, respectively, facing the closed end wall 18 and lying on planes which are substantially normal to the longitudinal axis of cylindrical wall 20.

Lugs 21 and 22 have forward wall portion 26 and 27 which are inclined or tapered toward the open end 19 of the cup shaped thread protector 17. Lugs 21 each have tapered side walls 28 and 29 which taper outwardly from the flat rear wall portions 25 and tapered forward wall portions 27. Lugs 22 similarly have tapered side wall portions 30 and 31. If desired, the inclined wall and tapered side walls of the lugs may be combined into a single continuous wall which is inclined toward the open or forward end and tapered from side to side. The tapering forward walls 26 and 27 of lugs 21 and 22 are capable sliding over the threads on the threaded end 11 of pipe 10 when threaded protector 17 is driven onto the end to protect threads thereof.

The flat rear faces 24 and 25 of lugs 21 and 22 are retaining faces which engage in the threads 11 of pipe 10 to hold thread protector 17 against being dislodged therefrom. The tapered side walls 28 and 29 of lugs 21 and tapered side walls 30 and 31 of lugs 22 facilitate the molding of the thread protector 17 by an injector molding precedure which will be subsequently described.

While the number of lugs 21 and 22 is not critical, it is preferred that there be from two to twelve of the lugs distributed around the inner cylindrical surface 23 with their respective end faces lying in a plane substantially normal to the longitudinal axis of the cylindrical side wall 20. While the device, as shown, will function with a set of lugs lying in a single plane, it is preferred that there be two or more sets of lugs 21 and 22, as shown in FIGS. 2 and 3, which lie in parallel planes, each of which is substantially normal to the longitudinal axis of cylindrical side wall 20.

When the cup shaped thread protector 17 is used for the protection of the threaded end portion 11 of pipe or conduit or casing 10, the thread protector is driven over the threaded end portion by application of an end-wise force such as by pounding by a hammer or the like on end wall 18. The inclined forward faces 26 and 27 of lugs 21 and 22 permit sliding movement over the threaded end portion 11.

The pointed projecting portion of lugs 21 and 22 defined by inclined walls 26 and 27 and flat end walls 24 and 25 projects into the threads to hold pipe thread protectors 17 against dislodgement. When it is desired to remove thread protector 17, it may be twisted and lugs 21 and 22 will follow the contour of the threads to permit the thread protector to be removed without damaging the lugs and thus permitting the thread protector to be used again.

Method of Manufacture

As noted above in the discussion of the prior art, hollow plastic articles having internal abutments or threads or the like have been molded in the past by use of two piece molds consisting of a hollow female mold and a projecting male mold portion which defines a mold cavity. In the past, the projecting male mold portion has usually had to be made in several parts so that it could collapse to permit it to be withdrawn from the molded part. In some cases, a solid inner male mold member could be used where the projection or threads in the molded part are shallow and the material was flexible enough to be stretched and forced over the grooves or depressions in the male mold member.

Figure 4:
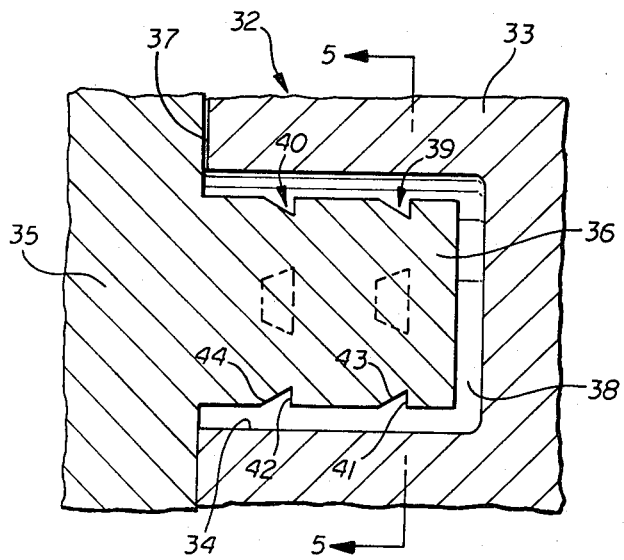
FIG. 4 is a view in longitudinal central section of a mold cavity for injection molding the thread protectors shown in FIGS. 2 and 3 and for purposes of illustrating an improved method of injection molding.
Figure 5:
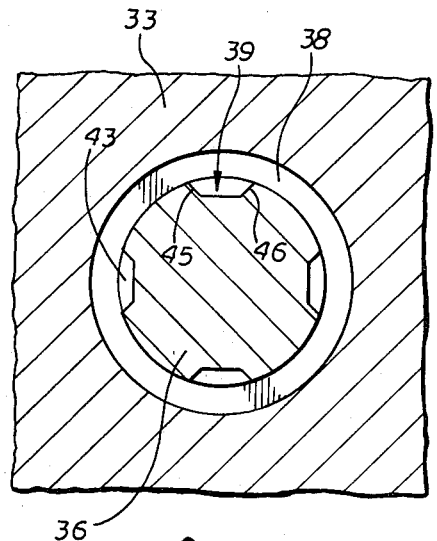
FIG. 5 is a sectional view of the mold of FIG. 4 taken on the line 5—5 thereof.

In this invention, the pipe thread protector 17 shown in FIGS. 2 and 3 is made by means of a novel injection molding process utilizing a mold having the structure shown in FIGS. 4 and 5.

In FIG. 4, there is shown a two part mold 32 consisting of a mold part 33 having a hollow cylindrical female mold cavity 34. A second mold member 35 has a projecting male part 36 which fits into female mold cavity 34 and is spaced from the walls thereof to define a mold cavity corresponding in shape to molded thread protector 17. A small opening 37 is provided which opens into mold cavity 38 for introduction of hot molten or fluid thermoplastic resin. The projecting male portion 36 of mold part 35 has a plurailty of cavities 39 and 40 which correspond to lugs 21 and 22 in thread protector 17.

Cavities 39 and 40 have flat end walls 41 and 42 which lie substantially on plane normal to the longitudinal axis of the mold cavity. Cavities 39 and 40 have inclined walls 43 and 44 which correspond to the inclined walls 26 and 27 of lugs 21 and 22. Side walls 45 and 46 of cavities 39 and 40 are tapered as seen in FIG. 5. This taper corresponds to the side taper of 28 and 29 as seen in FIG. 3 looking into the end of cup shaped thread protector 17. If the thread protector is made with a curved forwardly inclined surface which tapers from side to side, the recesses in the male mold portion are similarly constructed.

In the manufacture of thread protector 17 by the method of this invention, mold part 35 is positioned with projecting male portion 36 in cavity 34 of the female mold part 33. This defines a mold cavity 38 having the same shape as thread protectors 17 including the internal lugs 21 and 22 thereof. A hot, molten or fluid, thermoplastic resin (preferably a high impact nylon or a high impact polyethelene resin) is injected into mold cavity 38 by suitable injection molding equipment through inlet passage 37.

After mold cavity 38 is filled, it is allowed to cool partially so that the thermoplastic injection molded material solidifies in mold cavity 38. At this point, while the injection molded thermoplastic resin is solid, but not yet fully cooled, the mold part 35 is given a partial twist or turn by approximately one-half the angular distance between adjacent mold cavities 39. As this mold member 35 is twisted or turned, the lugs 21 and 22 which were formed in cavities 39 and 40 are compressed into the cylindrical side wall 20 of the molded thread protector 17.

The tapered side walls 45 and 46 of mold cavities 39 and 40 allow for the rotation of mold member 35 and the projecting part 36 without shearing off the lugs. When the mold member 35 has been twisted or turned a partial turn in this manner, it is removed from the interior of the injection molded plastic thread protector 17, and thread protector 17 is removed from the female mold cavity 34. Alternatively, the injection molded thread protector 17 may be removed along with mold part 35 (after the partial turn, described above) and the molded thread protector 17 stripped from the projecting mold part 36.

After injection molded thread protector 17 is removed from the mold cavity and from protecting mold part 36, the lugs 21 and 22 which were compressed into cylindrical side wall 20 recover from the compressed condition until they protrude to the normally extended distance inward as shown in FIGS. 2 and 3. This recovery results from the so called "memory" of the plastic which allows it to be deformed under conditions other than conditions of plastic flow and recover from the deformed condition to its original state.

While this invention has been described fully and completely with special emphasis upon a single preferred embodiment of the injection molded thread protector and with special emphasis upon a single preferred embodiment of a novel and improved method of injection molding of a thread protector, it should be understood that, within the scope of the appended claims, the invention may be practiced otherwise than as specifically described and shown herein.

We claim:
1. A method of manufacturing a cup shaped thread protector comprising a cup shaped or hollow cylindrical member of soft, elastic thermoplastic material having a rear end or closed end wall, a cylindrical side wall and an open forward end,
  a plurality of circumferentially oriented lugs spaced circumferentially from each other on and extending from the inner surface of said side wall and integral therewith, and
  each of said lugs being of a size and shape permitting the same to be forced over the threaded end of a pipe and to fit into and engage the threads thereof to prevent easy and accidental removal therefrom,
said method comprising:
  providing injection molding apparatus comprising a first mold member having a cylindrical female mold cavity and a second mold member comprising a male mold member having recesses in the surface thereof forming a negative image of said lugs on said cup shaped or hollow cylindrical member,
  placing said second mold member inside said first mold member to define a cup shaped or hollow cylindrical mold cavity,
  injecting hot, fluid, thermoplastic resin into said cup shaped or hollow cylindrical mold cavity to fill the same,
  allowing said resin to cool and solidify in said cup shaped mold cavity to produce said cup shaped or hollow cylindrical member,
  twisting said second mold member a fraction of a turn, sufficient to compress the lugs on said cup shaped or hollow cylindrical member into the cylindrical wall thereof, after said resin has solidified but before the same has cooled substantially.
  withdrawing said second mold member from said cup shaped member and from said first mold member, and
  separating said cup shaped or hollow cylindrical member from said first mold member and allowing said lugs to recover from compression into said cylindrical wall into an inwardly extending position and to cool in such position.
2. A method according to claim 1 in which
said cup shaped or cylindrical member has a smooth cylindrical exterior surface.

3. A method according to claim 1 in which
each of said lugs has a rear face toward the rear end of said hollow member extending substantially normal to the axis thereof and a forward face in the form of an inclined surface sloping toward said open end, said rear faces and inclined surfaces meeting at an acute dihedral angle.

4. A method according to claim 3 in which
said rear faces of said lugs lie substantially in a single plane.

5. A method according to claim 3 in which
said rear faces of said lugs lie in a plurality of substantially parallel planes spaced longitudinally of the axis of said cup shaped member.

6. A method according to claim 5 in which
a plurality of said lugs have the rear faces thereof lying substantially in one plane and another plurality of said lugs have the rear faces thereof lying substantially in a different plane.

7. A method according to claim 4 in which
there are from two to twelve lugs equally spaced on the inner surface of said cup shaped member.

8. A method according to claim 6 in which
there are from two to twelve lugs in each of said planes equally spaced on the inner surface of said cup shaped member.

9. A method according to claim 3 in which
each of said lugs has side walls on each side thereof tapering outward from said rear face and said forward face.

10. A method according to claim 1 in which
said second mold member is first withdrawn from said injection molded cup shaped or hollow cylindrical member and said member is subsequently ejected or removed from said female mold cavity.

11. A method according to claim 1 in which
said second mold member is withdrawn from said female mold cavity and said injection molded cup shaped or hollow cylindrical member is withdrawn therewith and subsequently ejected or removed therefrom.

12. A method according to claim 1, 10 or 11 in which
each of said lugs on said cup shaped or hollow cylindrical member has a rear face toward the closed end wall thereof extending substantially normal to the the axis thereof and a forward face in the form of an inclined plane sloping toward said open end, and
said recesses in second mold member have walls corresponding to the walls of said lugs.

* * * * *